Patented Mar. 25, 1952

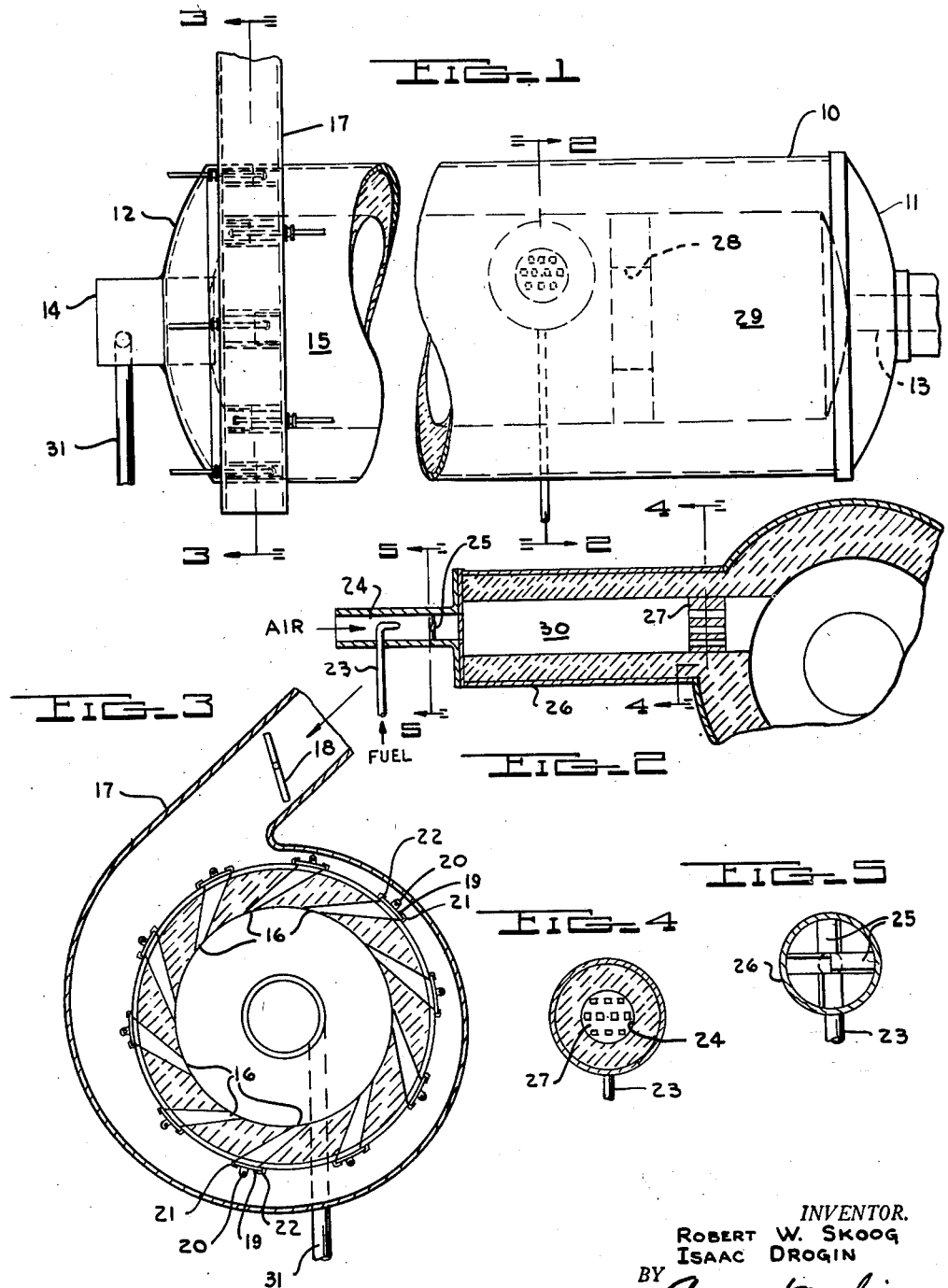

2,590,660

UNITED STATES PATENT OFFICE 2,590,660

APPARATUS FOR THE MANUFACTURE OF CARBON BLACK

Robert W. Skoog, Borger, Tex., and Isaac Drogin, Charleston, W. Va., assignors to United Carbon Company, Inc. (Maryland), Charleston, W. Va., a corporation of Maryland Application March 2, 1949, Serial No. 79,128

7 Claims. (Cl. 23—259.5)

The present invention relates to improvements in an apparatus for the manufacture of carbon black and in particular to such an apparatus and process wherein the atmosphere and temperature are closely controlled and which may be used with a pre-heated hydrocarbon for the production of carbon black.

In converters or furnaces of a type similar to the present invention, the hydrocarbon used as the starting material for the manufacture of carbon black, such as natural gas or oil, is mixed with a predetermined volume of air so that part of the natural gas or oil combines with the air to form a combustible mixture which provides the necessary heat to partially decompose that portion of the hydrocarbon starting material which is not burned and thus form, among other products, the desired carbon black.

Since oil is relatively expensive, this process has proven costly and hence leaves much to be desired when hydrocarbon oil alone is used as the carbon black source. It is also difficult to regulate the amount of air in the furnace when burning only part of the fuel which is injected.

In addition, severe coking results when preheated gas or oil is injected into a furnace or converter which is at a substantially different temperature than the gas or oil.

Another disadvantage of conventional converters is the lack of means for controlling the atmosphere within the converter. No provision is made for injecting anything except the hydrocarbon starting materials and air at a predetermined rate and volume.

Therefore, it is a principle object of the present invention to provide a process and apparatus for producing carbon black which utilizes auxiliary means for heating the converter or furnace separate from the injected hydrocarbon used as the carbon black source material, the process and apparatus thus producing a more efficient heating of the starting materials and consequent increased yields of carbon black.

It is a further object of the present invention to provide a process and apparatus for producing carbon black wherein a pre-heated hydrocarbon material is utilized and wherein the pre-heated hydrocarbon material and the furnace are maintained at approximately equal temperatures, thus eliminating much of the coking or adhering of the carbon particles to the converter and the injector.

It is a further object of the present invention to provide a heating device adapted for use with a carbon black furnace or converter which will reduce the cost of heating the furnace since the heating materials are separately burned under optimum combustion conditions to produce an efficient production of heat to pre-heat the furnace prior to the introduction of the hydrocarbon starting materials.

It is a further object of the present invention to provide an apparatus and process for producing carbon black wherein the atmosphere and temperature within the furnace can be closely controlled.

Other objects of this invention will appear in the following description and appended claims, reference being had to the accompanying drawings forming a part of this specification wherein like reference characters designate corresponding parts in the several views.

In the drawings:

Fig. 1 is a fragmentary side elevation of a carbon black furnace embodying the present invention.

Fig. 2 is a fragmentary sectional view taken in the direction of the arrows along the line 2—2, Fig. 1.

Fig. 3 is a sectional view taken in the direction of the arrows along the line 3—3, Fig. 1.

Fig. 4 is a sectional view of the auxiliary injector taken in the direction of the arrows along the line 4—4, Fig. 2.

Fig. 5 is a sectional view of the auxiliary injector showing a baffle and taken in the direction of the arrows along the line 5—5, Fig. 2.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The improvements constituting the present invention may be applied to a carbon black furnace such as that shown, for example, in Fig. 1, which includes an outer steel casing 10. In the furnace construction illustrated in the drawings, the casing 10 is generally circular in cross section, thereby providing a generally cylindrical furnace. The cylinder is a preferred shape for the furnace, but the construction is not limited thereto. The casing 10 is provided with ends 11 and 12 which communicate respectively with the flue opening 13 and the hydrocarbon starting material injector 14. The injector 14 is provided with circumferential slots (not shown) which inject the hydrocarbon starting material as a plurality of radially extending streams into the chamber 15.

Air is supplied to the chamber 15 through the ducts 16 by means of the manifold 17 which is connected with a suitable source of air under pressure. The amount of air passing into the manifold 17 is controlled by a valve 18. The air ducts 16 connect the manifold 17 with the interior of the furnace and each of the air ducts extends on a line generally tangential to the circumference of the inside of the furnace. Thus, air is introduced through each of the air ducts 16 in a direction generally tangential to the interior circumference of the furnace. This provides a whirlpool effect in the air as it is introduced into the furnace. Into the vortex of this whirlpool the hydrocarbon starting material is drawn from the end of the injector 14. This provides a uniformly turbulent admixture of the starting material and air at the entrance of the furnace. It has been found that this method provides uniformity in the turbulent admixture and in so doing, provides a uniform admixture from which the carbon black is formed efficiently as the mixture progresses through the furnace.

In order to assure a uniform head of air and consequently a uniform distribution of air through the ducts 16 and into the furnace, the header or manifold is formed as shown in Fig. 3, so that the capacity of the header decreases as the volume of air flowing therethrough is decreased by being drawn through the air ducts 16. This provides a construction which in cross section resembles a portion of a spiral as the diameter of the cross sectional area between the outer wall of the manifold 17 and wall of the furnace 10 gradually decreases in the direction of air flow.

The progressive decrease in the capacity of the header is approximately proportional to the decrease in volume of the air supplied thereto, and thus the velocity of the air is maintained constant at the port of each of the ducts 16. Thus, by controlling the valve 18, the total volume of air supplied to the manifold is controlled. The manifold 17 acts as a self-metering manifold to provide a substantially constant head of air at each of the air ducts 16.

In order to further control the amount of air supplied through the ducts 16, a separately controlled valve is provided at the entrance of each of said ducts. Each of said valves includes a plate 19 having a handle 20 secured thereto. Plate guides 21 and 22 are provided adjacent each side of the plate 19 and act as ways in which the plate 19 is guided for sliding movement to open or close the ducts 16.

An auxiliary fuel injector is provided on the side of the furnace and comprises a fuel inlet 23, a nozzle placed in the air chamber 24, a plurality of baffles 25, a shell or casing 26 and a grid or checker member 27.

The refractory material inside the wall 10 and the ends 11 and 12 of the converter also extends through the flue 13 and the shell 26 of the auxiliary fuel injector and may be formed of any suitable heat-resisting refractory material, such for example, as fire brick.

At a point adjacent the flue 13, a mixing orifice 28, also formed of a suitable refractory material, is located. This divides the furnace into sections 15 and 29 which communicate through the annulus in the orifice 28.

The device of the present invention is operated as follows:

A fuel such as natural gas, which is relatively inexpensive and has a high heat content, is injected through the nozzle of the conduit 23 into the chamber 24 through which air is introduced in suitable amounts to establish optimum combustion of the gas. The mixture of gas and air passes through the baffles 25 which impart a turbulent swirling motion thereto which thoroughly mixes the gas and air prior to its entry into the chamber 30 of the auxiliary injector. The mixture of gas and air then passes through the grid or checker member 27. The passage of the gas and air mixture through the holes in the grid 27 provides a plurality of streams of a combustible fuel and air mixture which are introduced into the furnace in a tangential direction, thus providing a whirling motion to said combustible mixture within said furnace which throws the mixture toward the inner walls of the furnace where it is burned to heat the refractory lining of the furnace.

A pre-heated source of hydrocarbon material such as natural gas or oil is introduced at a constant rate and volume through the injector 14, and is mixed with the air introduced into the chamber 15 through the manifold 17 and ports 16. The air is introduced under pressure at a substantially constant rate and volume as previously described. The gas streams are diffused into and admixed with the swirling mass of air, and when a combustible mixture of air and gas has resulted, it is burned within the converter with a swirling active flame. The flame and the gas and air at the same time move longitudinally of the furnace toward the flue 13 which is connected through a carbon collecting system (not shown) with a stack (also not shown).

The burning gases, as they traverse the furnace, are further mixed and blended as they pass the mixing orifice 28. As the mixture enters the chamber 29, a further turbulence is created due to the mixing of the burning gases, the unburned gases, and any air which may not have combined with the gas during its travel through the forepart of the furnace. The products of combustion and the decomposed gases carrying with them the produced carbon black, pass out of the chamber 29 and through the flue 13. The carbon black suspended in the produced gases is then isolated from the gases by any desired separating and collecting apparatus known to the art, such for example as an electric precipitator (not shown).

The amount of air and gas introduced into the combustion chamber of the furnace is regulated so that the mixture of gas and air is always such that a portion of the gas is not burned but instead is decomposed by the heat supplied by the burned gas and air mixture, and the burned mixture of fuel and air from the auxiliary injector. Consequently, the quantity of air introduced into the chamber is regulated with relation to the total amount of starting material introduced through the supply tube 31. The extent of combustion permitted controls the temperatures within the furnace and has been found to affect the type of carbon black produced. Thus regulation of the relative amounts of air and gas is determined by the temperatures to be maintained to produce the particular type of carbon black which is to be manufactured.

When oil is used as the hydrocarbon starting material instead of natural gas, the required heat can be supplied through the burning of the fuel and air injected into the furnace from the auxiliary injector. Thus most of the oil is decomposed to produce carbon black and very little is actually burned to provide heat for the reaction. This adds to the economy of the process since the fuel used in the auxiliary injector may be a fuel such as gas which is relatively less expensive than oil.

The selection of the sizes, numbers, and placements of the air inlet ducts 16 is controlled and may be varied to provide a substantially uniform distribution of the air inside the furnace at pressures which require relatively low power consumption. The spacing of the air ducts determines to a large extent the uniformity of the air distribution within the combustion chamber while the sizes and numbers of the ducts determine the air pressures required to deliver given volumes of air to the furnace during a given time interval. The desired volume of air to be delivered through the ducts in a given time interval is regulated by adjustment of the sliding plates 19 to provide the desired temperatures within the furnace. This same temperature control can also be accomplished by controlling the volume of air injected with the fuel into the furnace from the auxiliary injector.

If it is desired to close off certain of the ducts 16, this may be done by adjustment of a particular sliding plate 19 without affecting the adjustment of the plate 19 relative to another duct. This adjustment is effected manually in the construction here shown, but it may be done by automatic control means if desired.

The air and the gas which is mixed to form a combustible mixture is burned inside the furnace with a turbulent active flame. The entire furnace is filled with the resultant flame and the products of combustion and decomposition of gas. With this apparatus carbon black is produced in a continuous process which does not require intermittent batch or cyclic operations.

In the construction here provided the combined capacity of the gas and air inlets is greater than that of the flue outlet. This assures a definite control of the temperatures created within the furnace for all air supplied thereto must be supplied under a positive pressure.

The gas and air are admixed at positive pressures prior to combustion which in typical instances may vary as desired from approximately 1 to approximately 4 inches of water. By thus eliminating negative pressures in the furnace it is not necessary to relay upon natural draft as the means of supplying air to the combustion chamber. Thus a positive control of the volume, direction, and velocity of the air is assured. This in turn produces more uniform operating conditions and assures the uniform production of a carbon black product having predetermined and controlled characteristics.

By varying the type of material put through the auxiliary injector, it is possible to either add or subtract heat from the reaction within the furnace. Air may be supplied through the auxiliary injector, in which event an oxidizing gas is supplied to the interior of the furnace and this will result in the addition of heat to the process. If desired, an inert or reducing atmosphere may be created in the auxiliary injector and when this is sent through the furnace variations of the heat conditions therein will result.

The auxiliary injector may also be used to give any desired type of preliminary treatment to either an oil or a gas prior to injection of the treated product into the furnace.

By the foregoing, it will be seen that the present invention provides a process and apparatus for the production of carbon black which is both economical and efficient, and which includes means for closely controlling the atmosphere and temperature within a carbon black producing furnace.

Having thus described our invention, we claim:

1. A furnace for producing carbon black from hydrocarbons comprising a cylindrical refractory-lined reaction chamber having a flue outlet at one end and an axially disposed hydrocarbon inlet at the other end, a plurality of air inlet ducts located at said other end and concentrically disposed with respect to said hydrocarbon inlet, an annulus normal to the axis and intermediate the ends of the reaction chamber forming a mixing orifice, and an auxiliary chamber formed in the side wall of said reaction chamber and having a discharge outlet communicating with the interior of the latter intermediate the inlet end and the annulus of said reaction chamber, said auxiliary chamber having a refractory checker member in its discharge outlet to permit the gaseous products from said auxiliary chamber to be discharged tangentially into the reaction chamber of the furnace.

2. A furnace for producing carbon black from hydrocarbons comprising a cylindrical refractory-lined reaction chamber having a flue outlet at one end and an axially disposed hydrocarbon inlet at the other end, a plurality of air inlet ducts located at said other end and concentrically disposed with respect to said hydrocarbon inlet, an annulus normal to the axis and intermediate the ends of the reaction chamber forming a mixing orifice, said annulus being located relatively closer to the flue outlet end of the reaction chamber than to its other end, and an auxiliary chamber having a discharge outlet communicating with the interior of the reaction chamber adjacent to and on the upstream side of said mixing orifice and a grid member in the discharge outlet of the auxiliary chamber to permit passage of the gaseous products from said auxiliary chamber tangentially into the reaction chamber of the furnace.

3. A furnace for producing carbon black from hydrocarbons comprising a cylindrical refractory-lined reaction chamber having a flue outlet at one end and an axially disposed hydrocarbon inlet at the other end, a plurality of tangential air inlet ducts located at said other end and around the periphery of said reaction chamber, an annulus normal to the axis and intermediate the ends of the reaction chamber forming a mixing orifice, said annulus being located relatively closer to the flue outlet end of the reaction chamber than to its other end, and an auxiliary chamber having a discharge outlet communicating with the interior of the reaction chamber and located immediately on the upstream side of said mixing orifice so as to be substantially nearer said mixing orifice than the inlet end of said reaction chamber, said auxiliary chamber having a grid member to permit passage of gaseous products tangentially into the reaction chamber of the furnace.

4. A furnace for producing carbon black from hydrocarbons comprising a cylindrical refractory-lined reaction chamber having a flue outlet at one end and an axially disposed hydrocarbon inlet at the other end, a plurality of tangential air inlet ducts located at said other end and around the periphery of said reaction chamber, an annulus normal to the axis and intermediate the ends of the reaction chamber forming a mixing orifice, said annulus being located relatively closer to the flue outlet end of the reaction chamber than to its other end, and an auxiliary chamber having a discharge outlet communicating with the interior of the reaction chamber and located immediately on the upstream side of said mixing orifice so as to be substantially nearer said mixing orifice than the inlet end of said reaction chamber, said auxiliary chamber having air and fuel inlets for introducing air and fuel thereinto and a grid member to permit passage of jets of gaseous products and flames tangentially into the reaction chamber of the furnace.

5. A furnace for producing carbon black from hydrocarbons comprising a cylindrical refractory-lined reaction chamber having a flue outlet at one end and an axially disposed hydrocarbon inlet at the other end, a plurality of air inlet ducts located at said other end and concentrically disposed with respect to said hydrocarbon inlet, an annulus normal to the axis and intermediate the ends of the reaction chamber forming a mixing orifice, and a cylindrical auxiliary chamber having a discharge outlet at its one end communicating with the interior of the reaction chamber adjacent to and on the upstream side of said mixing orifice, said auxiliary chamber having an air inlet opening at its other end for supplying air under pressure thereinto, a fuel inlet located in said air inlet opening for directing fuel into said auxiliary chamber, and a grid member in said discharge outlet to permit discharge of the gaseous products and flames therefrom tangentially into the reaction chamber of the furnace.

6. A furnace for producing carbon black from hydrocarbons comprising a cylindrical refractory-lined reaction chamber having a flue outlet at one end and an axially disposed hydrocarbon inlet at the other end, a plurality of air inlet ducts located at said other end and concentrically disposed with respect to said hydrocarbon inlet, an annulus normal to the axis and intermediate the ends of the reaction chamber forming a mixing orifice, and a cylindrical auxiliary chamber having its axis substantially tangent to the circumference of the reaction chamber and a discharge outlet at its one end communicating with the interior of the reaction chamber adjacent to and on the upstream side of said mixing orifice, said auxiliary chamber having an air inlet duct at its other end for supplying air under pressure thereinto, a fuel inlet located in said air inlet duct for directing fuel into said auxiliary chamber, and a grid member in said discharge outlet to permit discharge of the gaseous products and flames therefrom tangentially into the reaction chamber.

7. A furnace for producing carbon black from hydrocarbons comprising a cylindrical refractory-lined reaction chamber having a flue outlet at one end and an axially disposed hydrocarbon inlet at the other end, a plurality of air inlet ducts located at said other end and concentrically disposed with respect to said hydrocarbon inlet, an annulus normal to the axis and intermediate the ends of the reaction chamber forming a mixing orifice, and a cylindrical auxiliary chamber having its axis substantially tangent to the circumference of the reaction chamber and a discharge outlet at its one end communicating with the interior of the reaction chamber adjacent to and on the upstream side of said mixing orifice, said auxiliary chamber having an air inlet duct at its other end for supplying air under pressure thereinto, a fuel inlet located in said air inlet duct for directing fuel into said auxiliary chamber, baffle means in said air inlet duct for mixing said fuel with incoming air, and a grid member in said discharge outlet to permit discharge of the gaseous products and flames therefrom tangentially into the reaction chamber.

ROBERT W. SKOOG.
ISAAC DROGIN.

REFERENCES CITED

The following references are of record in the file of this patent:

UNITED STATES PATENTS

| Number | Name | Date |
|---|---|---|
| 850,996 | Cooley | Apr. 23, 1907 |
| 1,312,147 | Wallwin | Aug. 5, 1919 |
| 1,618,808 | Burg | Feb. 22, 1927 |
| 1,795,347 | Reese | Mar. 10, 1931 |
| 1,990,697 | Keeling | Feb. 12, 1935 |
| 2,153,951 | Barber | Apr. 11, 1939 |
| 2,368,828 | Hanson et al. | Feb. 6, 1945 |
| 2,375,795 | Krejci | May 15, 1945 |
| 2,413,586 | Skoog | Dec. 31, 1946 |